No. 838,617. PATENTED DEC. 18, 1906.
F. GOLWIG.
MEANS FOR EFFECTING AND CONTROLLING THE STORAGE OF WATER
IN HYDRAULIC POWER SYSTEMS.
APPLICATION FILED MAY 5, 1906.
3 SHEETS—SHEET 1.
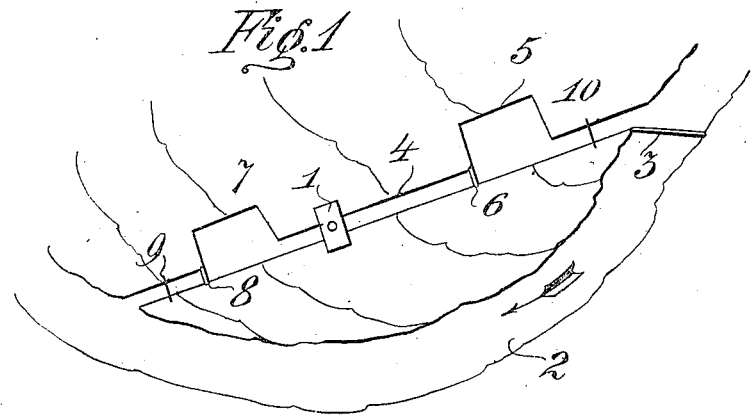
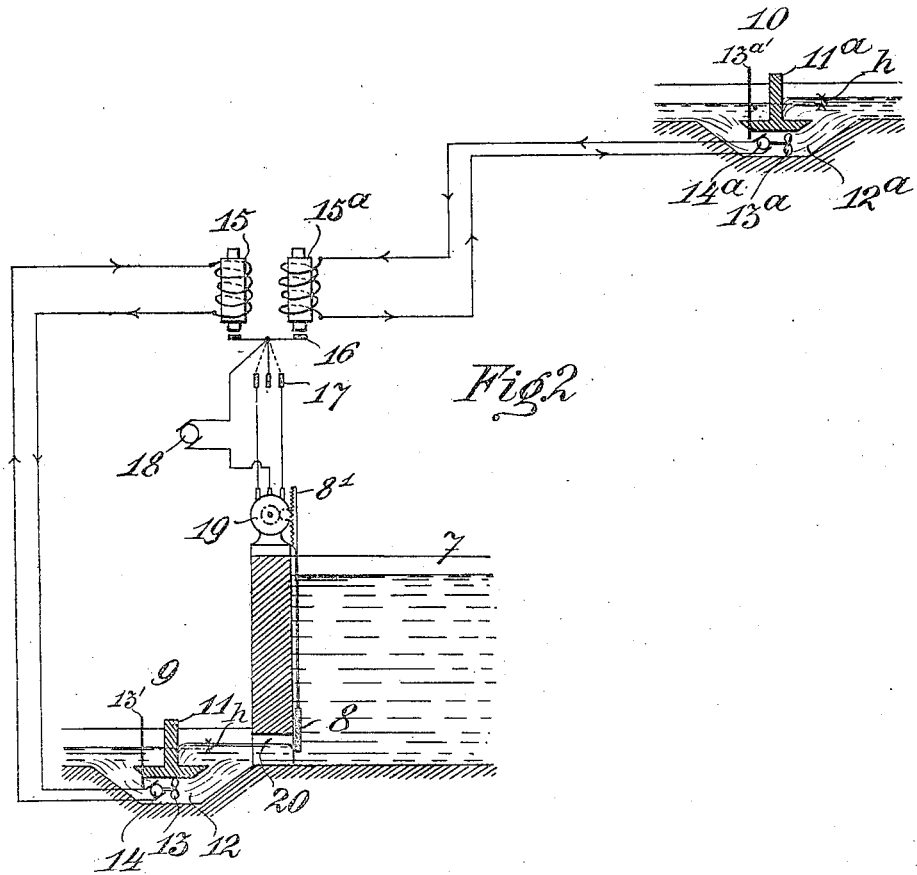
Witnesses
Inventor
Fritz Golwig
by his Attorney No. 838,617. PATENTED DEC. 18, 1906.
F. GOLWIG.
MEANS FOR EFFECTING AND CONTROLLING THE STORAGE OF WATER
IN HYDRAULIC POWER SYSTEMS.
APPLICATION FILED MAY 5, 1906.

3 SHEETS—SHEET 2.

Witnesses
Inventor
Fritz Golwig
by his Attorney

No. 838,617. PATENTED DEC. 18, 1906.
F. GOLWIG.
MEANS FOR EFFECTING AND CONTROLLING THE STORAGE OF WATER IN HYDRAULIC POWER SYSTEMS.
APPLICATION FILED MAY 5, 1906.
3 SHEETS—SHEET 3.
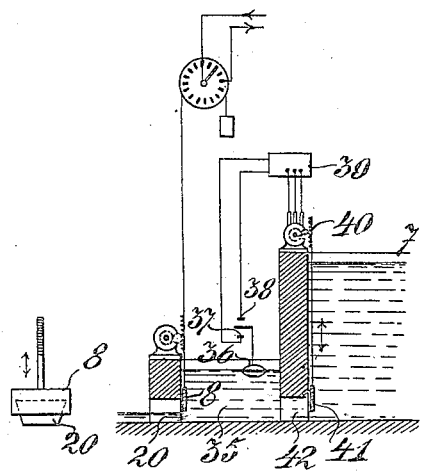
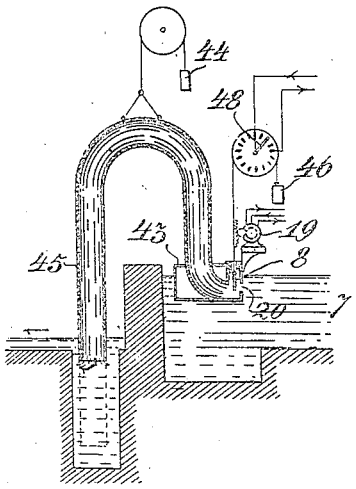
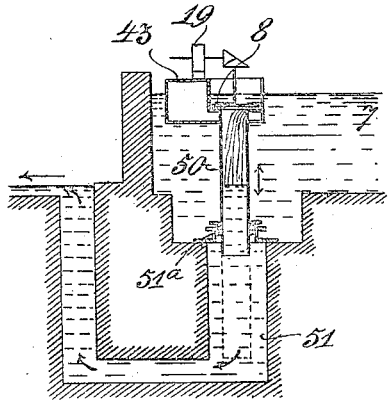
Witnesses
Inventor
Fritz Golwig
by his Attorney

UNITED STATES PATENT OFFICE.

FRITZ GOLWIG, OF VIENNA, AUSTRIA-HUNGARY.

MEANS FOR EFFECTING AND CONTROLLING THE STORAGE OF WATER IN HYDRAULIC-POWER SYSTEMS.

No. 838,617.        Specification of Letters Patent.        Patented Dec. 18, 1906.

Application filed May 5, 1906. Serial No. 315,428.

*To all whom it may concern:*

Be it known that I, FRITZ GOLWIG, a subject of the Emperor of Austria-Hungary, residing at Vienna, Austria-Hungary, have invented certain new and useful Improvements in Means for Effecting and Controlling the Storage of Water in Hydraulic-Power Systems, of which the following is a specification.

This invention relates to means for effecting and controlling the temporary storage of water used for hydraulic-power purposes in order to secure a temporary auxiliary supply of energy during periods at which the load is heavy, the arrangement being such that the continuous discharge of water from the "tail-race" is not interfered with during the period of storage and during the subsequent utilization of the stored energy.

The invention substantially consists in arranging, in combination with a high-level reservoir, a low-level reservoir which is filled and emptied at exactly the same rate as the upper reservoir is emptied and filled, the inflow to either of the said reservoirs being at all times contemporaneous with and equal to a corresponding outflow from the other reservoir.

The invention is illustrated in the annexed drawings, in which—

Figure 3:
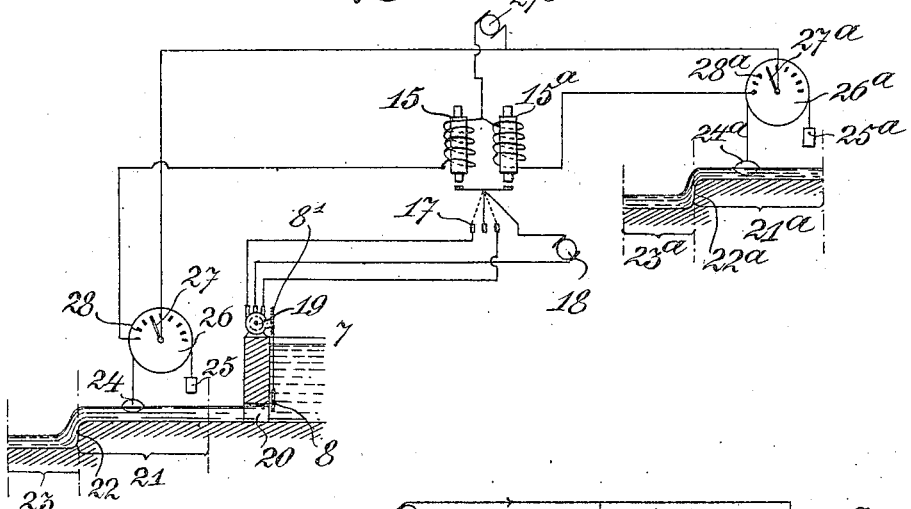
Figure 4:
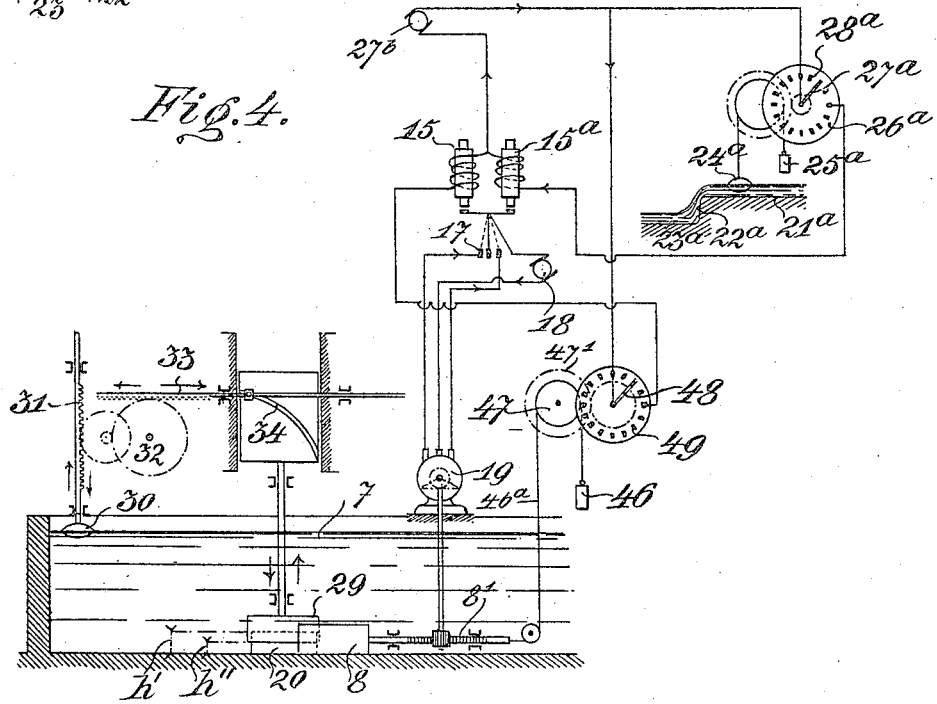

Figure 1 is a diagrammatic plan view of the hydraulic system, Figs. 2 to 7 being diagrams representing various forms of apparatus suitable for controlling the said system.

Means for temporarily storing energy in hydraulic-power systems for the purpose of utilizing the same at periods when a large load or overload is to be dealt with have in recent times acquired considerable importance in view of the erection of electric-power-generating stations. As is known, such stations, and more particularly those which mainly deal with lighting-loads, consume a comparatively small amount of power during the hours of daylight and during certain hours of the night, the full supply of power or a considerable portion thereof being only required during that period of the day at which artificial light is in general use—that is to say, during the evening and early hours of the night. In such cases it is of course of great advantage if the supply of water unused during the daytime, and more particularly during the later night hours, can be stored in order to be utilized at that period at which a larger amount of power is required—that is to say, during the evening and early hours of the night. Similar considerations apply, of course, in cases where a highly-fluctuating motor-load is dealt with—for instance, in connection with rolling-mills and various other industrial undertakings. Hitherto, however, the temporary storing of water has in most cases been prevented by the fact that the persons possessing rights affecting the lower watercourses object to any interruption or fluctuation in the rate of flow, and interruptions or fluctuations could not hitherto be prevented when a greater or less proportion of the water-supply was temporarily intercepted for the purpose indicated. This disadvantage is obviated by the present invention, which allows of storing any desired quantity of water in a head-race and of subsequently utilizing the said water for the purpose of coping with an increased demand for power without in any way interfering with the continuity of the flow of water from the tail-race.

In Fig. 1 of the drawings, 1 diagrammatically represents hydraulic apparatus, such as a turbine or system of turbines or other engines, to which water is supplied from the watercourse 2 by means of the race 4, which communicates with the latter above the weir 3.

5 represents a reservoir located in the known manner in the head-race, water being stored in the said reservoir during periods of light load by suitably adjusting the gate 6.

In the tail-race there is arranged a reservoir 7, provided with a gate 8, adapted to control the discharge of water. The gates 6 and 8 are so controlled that during the filling of the upper reservoir at a certain rate for the purpose of storing energy water is discharged at exactly the same rate from the lower reservoir—that is to say, the quantity of water discharged per unit of time from the reservoir 7 is equal to the quantity of water retained or stored in the reservoir 5 during the same unit of time. On the other hand, during the discharge of the stored water from the reservoir 5 for the purpose of increasing the supply of power the excess of water used in the system is retained in the reservoir 7.

In order to perfectly fulfil the purpose for which it is provided, the reservoir 7 should be of the same capacity as the reservoir 5. The reservoir 7 is filled before the working of the system is started, so that the discharge of water from the tail-race while water is entering the head-race is only once interrupted or prevented. At all other times the rate of outflow at 9, below the reservoir 7, is equal to the rate of inflow at 10, above the reservoir 5.

For controlling the inflow and outflow of water in the manner indicated two uniform sets of hydrometric apparatus are provided, which measure and indicate the rate of flow through two uniform sections of the race, located at 9 and 10, respectively, the gate 8 or its equivalent being adjusted automatically or by hand in such a manner that the rate of flow at 9 is at all times equal to the rate of flow at 10. Fig. 2 diagrammatically illustrates means for this purpose. At 9 and 10 two exactly uniform metering-ducts 12 and $12^a$ are provided, these ducts being always filled with water and under pressure, independently of the water-level and velocity of flow in the race. For this purpose two uniform depressions are formed in the race 4, and bridges 11 and $11^a$, perpendicular to the direction of the current, are placed across these depressions. The duct 12 below the bridge 11 contains hydrometric apparatus, comprising a rotary helical blade 13, adapted to operate a small dynamo 14, exactly similar apparatus $13^a$ and $14^a$ being arranged in a corresponding position below the bridge $11^a$. Since the cross-sectional areas of the ducts 12 and $12^a$ are exactly alike, the velocity of the water acting on the blades 13 and $13^a$ may be taken as a direct measure of the rate of flow at 9 and 10, respectively. The measurement of the rate of flow thus directly involves only a single factor, the velocity, and not the two factors, velocity and area. The dynamos 14 and $14^a$ are adapted to excite the electromagnets 15 and $15^a$, respectively, and the latter control, by means of their armatures 16, a reversing-switch 17, arranged in the circuit of a dynamo 18, adapted to drive an electromotor 19. The latter is adapted to control the gate 8 by means of toothed gear 8' in order to regulate the aperture 20 for the discharge of water from the reservoir 7. So long as the rate of flow at 9 and 10 is equal, and therefore produces equal excitation of the magnets 15 and $15^a$ by the dynamos 14 and $14^a$, the circuit of the dynamo 18 is broken by means of the switch 17, and the position of the gate 8 thus remains unaltered. If, however, the rate of flow at 9 and 10 becomes unequal, and thus produces unequal excitation of the electromagnets 15 and $15^a$, the switch 17 is so operated that clockwise or anticlockwise rotation is imparted to the motor 19 by the dynamo 18, and the gate 8 is by this means raised or lowered until the rate of flow at 9 and 10 has again become equal.

Instead of using hydrometric blades 13 and $13^a$ for measuring the rate of flow of the water hydrometric tubes 13' and $13^{a\prime}$ can be provided, or the difference of level $h$ above and below the bridges 11 and $11^a$ can be used for measuring and regulating purposes.

In some cases the use of the ducts 12 and $12^a$ may be undesirable—for instance, if a large quantity of ice is liable to be present in the race. In the modification illustrated in Fig. 3 the siphon-like ducts 12 and $12^a$ are dispensed with, and uniform metering-sections are formed by means of small falls 22 and $22^a$ and straight measured ducts 21 23 and $21^a$ $23^a$ above and below the said falls. These metering-sections are exactly alike as regards length, depth, and shape, so that the relative rate of flow through the two sections can be directly determined by direct or indirect measurement of the depth of water above the falls 22 and $22^a$, respectively—that is to say, if the depth of water measured at a certain point above the fall $22^a$ is equal to the depth measured at the corresponding point above the fall 22 the rate of flow through the two metering-sections is equal. For the purposes of the measurement floats 24 and $24^a$, balanced by means of weights 25 and $25^a$, respectively, may be arranged above the two falls in such a manner that the movements of the said floats due to changes in the water-level impart rotation to disks 26 and $26^a$, respectively. The latter are provided with series of contact-studs 28 and $28^a$, connected with electric resistances, and the rotation of the disks causes the said studs to successively make contact with contact-levers 27 and $27^a$, respectively. The levers 27 and $27^a$ are connected in parallel to one terminal of a dynamo $27^b$, to the other terminal of which are connected, also in parallel, the coils of two electromagnets 15 and $15^a$. The said coils are also connected with the contact-studs 28 and $28^a$, respectively. The magnets 15 and $15^a$ control a reversing-switch 17 in the circuit of a dynamo 18, adapted to drive a motor 19 for the purpose of adjusting, by means of toothed gear 8', the gate 8, which controls the discharge-aperture 20 of the reservoir 7. If either of the floats 24 $24^a$ performs a vertical movement unaccompanied by a corresponding movement of the other float, the balance of resistance in the circuits of the electromagnets 15 and $15^a$ is disturbed, so that the switch 17 is operated and causes the motor 19 to raise or lower the gate 8 until the water-level controlling the float 24 is equal to that controlling the float $24^a$, so that the balance of resistance is restored.

In many cases the water-level, pressure, and velocity of flow below the discharge-aperture of the reservoir 7 continuously change, and in order to obviate the necessity for continuous movement of the gate 8 or its equivalent while the inflow to the head-race remains constant it is desirable to render the area of the said discharge-aperture independent from the changes of pressure, so that a certain size of the aperture or position of the gate 8 corresponds to each rate of flow in the head-race at 10, Fig. 1. Various means can be adopted for this purpose, one example being illustrated in Fig. 4. In this example the gate 8, controlling the discharge-aperture 20 of the reservoir, is adapted to be horizontally moved by means of toothed gear 8′, operated by the electromotor 19, and an auxiliary vertically-movable gate 29 is provided, which automatically increases or reduces the effective area of the aperture in accordance with changes of the water-level in the reservoir 7. For this purpose the auxiliary gate 29 is connected with a float 30 by means of transmission-gear comprising a rack 31, toothed wheels 32, and rack 33, the relative movements of the float and auxiliary gate being determined by the ratio of transmission and by a cam-cylinder 34 or its equivalent constructed according to the known formula relative to the change of pressure with height, ($v=\sqrt{2\ gh}$.) Thus, for example, the raising of the lower edge of the auxiliary gate to the level $h'$ may correspond to the lowest water-level in the reservoir 7, and the lowering of the said edge to the level $h''$ may correspond to the highest water-level in the said reservoir. Instead of using mechanical means for transmitting movement from the float 30 to the auxiliary gate 29, as illustrated, electric means comprising an electromotor and relay can of course be used. In either case the action of the changing pressure at the discharge-aperture 20 is eliminated by the auxiliary gate 29, and a definite position of the gate 8, entirely independent from the water-level in the reservoir 7, corresponds to each rate of flow which may occur above the reservoir 5. The direct control of the discharge-aperture by means of the rate of flow through the upper metering-section can, for example, be effected by means of a motor which is caused by any given change in the said rate of flow to impart a definite exactly predetermined movement to the gate 8. Means for this purpose are illustrated by way of example in Fig. 4, in which the numerals 15, 15$^a$, 17, 18, 19, 21$^a$, 22$^a$, 23$^a$, 24$^a$, 25$^a$, 26$^a$, 27$^a$, 27$^b$, and 28$^a$ represent elements of apparatus analogous to the elements indicated by the same numerals in Fig. 3. In the construction shown in Fig. 4, however, the relative rates of flow below the reservoir 7 and above the reservoir 5 are not used for controlling the apparatus which adjusts the gate 8, and thus regulates the effective area of the discharge-aperture 20; but the position of the gate 8 is directly used for the purpose of the measurement. For this purpose the said gate is connected with a weight 46 by means of a cord 46$^a$, which passes over a pulley 47, connected, by means of transmission-gear 47′, with the lever 48 of a rheostat 49, the latter being connected with the coil 15 and the lever 48 being connected to the dynamo 27$^b$ in parallel with the lever 27$^a$. Movement imparted to the gate 8 by means of the motor 19 in consequence of a change in the rate of flow at 21$^a$ causes the lever 48 to be operated until the balance of electric resistance in the circuits of the electromagnets 15 and 15$^a$ has been restored.

Another example of means suitable for eliminating the action of changes of pressure at the discharge-orifice 20 is illustrated in Fig. 5. In this example there is arranged below the reservoir 7 a tank 35, from which the water is discharged through an aperture 20, controlled by a gate 8. The water-level in the tank 35 is kept constant, for example, by means of a float 36, two fixed abutments 37 and 38, relay 39, and motor 40, adapted to adjust a gate 41, controlling an aperture 42, by means of which the reservoir 7 communicates with the tank 8. The rising and falling of the water-level in the tank 8 within certain limits causes a lowering or raising of the gate 41 to take place, so that the rate of flow through the aperture 42 is reduced or increased. In this case also a definite effective area of the aperture 20—i. e., a definite position of the directly-adjusted gate 8—corresponds to each rate of flow in the head-race above the reservoir 5. In order to exactly maintain direct proportionality in the vertical adjustment between the two metering-sections, the variations of pressure resulting from changes in the height of the aperture 20 are eliminated by reducing the width of the said aperture toward the bottom thereof in accordance with the formula $V=\sqrt{2\ gh}$, as shown separately at the left-hand side of Fig. 5.

Another example of means suitable for the same purpose is illustrated in Fig. 6. In this example a hollow float 43 is arranged in the reservoir 7 at the lower end of one arm of a movable siphon-tube 45, balanced by means of a weight 44, so that the said tube ascends and descends with the float in accordance with the rising and falling of the water-level in the reservoir, the float being at all times immersed to the same extent. The pressure at the aperture 20 by means of which the interior of the siphon-tube communicates with the reservoir 7 is therefore constant. The other arm of the siphon-tube communicates with the race below the reservoir 7. The adjustment of the gate 8, which regulates the aperture 20, is effected by means of the motor 19, which is controlled by means of apparatus comprising a balance-weight 46 and rheostat 48 49 equivalent to the corresponding elements of apparatus described with reference to Fig. 4. Each position of the said gate thus directly corresponds to a definite rate of inflow to the head-race.

Another example of means for controlling the discharge of water from the reservoir 7 is illustrated in Fig. 7. In this case also a hollow float 43 is used, which is at all times immersed to the same extent in the water contained in the reservoir 7. A vertical tube 50, rigidly fixed to the said float, extends through a stuffing-box 51<sup>a</sup> into a well 51 at the bottom of the reservoir 7, so that the extent to which the said tube is located in the well depends on the water-level in the reservoir. The well 51 communicates with the race below the reservoir, and the upper orifice of the tube 50, which is controlled by means of a valve 8 or equivalent device, is located at a constant distance below the water-level in the reservoir, so that the pressure at the said orifice at is all times equal.

With those forms of construction in which variations of pressure at the discharge-orifice of the reservoir 7 are eliminated, so that a definite effective area of the said orifice corresponds to each rate of flow above the upper reservoir 5, the metering-section in the tail-race can be dispensed with, the discharge-orifice being directly controlled by the rate of flow at the upper metering-section. It is obvious that the control of the said orifice can be effected by means of pneumatic or hydraulic apparatus instead of by means of an electromotor.

What I claim as my invention, and desire to secure by Letters Patent of the United States, is—

1. The combination with a head-race and tail-race of a high-level storage-reservoir located in the former, a low-level storage-reservoir located in the latter, and means for causing the quantity of water discharged per unit of time from said low-level reservoir to exactly correspond to the quantity of water stored in the high-level reservoir during the same unit of time substantially as described.

2. The combination with a head-race and tail-race of a high-level storage-reservoir located in the former, a low-level storage-reservoir located in the latter, means for causing the quantity of water discharged per unit of time from said low-level reservoir to exactly correspond to the quantity of water stored in the high-level reservoir during the same unit of time and hydraulic-power-distributing means located between the reservoirs aforesaid substantially as described.

3. The combination with a head-race and a tail-race, of a high-level storage-reservoir located in the former, a low-level storage-reservoir located in the latter, means for controlling the discharge from said reservoirs, means for measuring the rate of water-flow above said high-level reservoir and means for regulating the discharge-controlling means of the low-level reservoir in accordance with said rate of flow substantially as described.

4. The combination with a head-race and a tail-race, of a high-level storage-reservoir located in the former, a low-level storage-reservoir located in the latter means for controlling the discharge from said reservoirs, means for measuring the rate of water-flow above said high-level reservoir and below said low-level reservoir and means for causing differences in said rates of flow to operate the discharge-controlling means of said low-level reservoir substantially as described.

5. The combination with a head-race and a tail-race of a high-level storage-reservoir located in the former, a low-level storage-reservoir located in the latter, means for controlling the discharge from said reservoirs, means for measuring the rate of water-flow above said high-level reservoir and below said low-level reservoir, means for causing differences in said rates of flow to operate the discharge-controlling means of said low-level reservoir and means for eliminating variations of pressure at the discharge from the low-level reservoir due to variations of water-level therein substantially as described.

6. The combination with a head-race and a tail-race, of a high-level storage-reservoir located in the former, a low-level storage-reservoir located in the latter, means for controlling the discharge from said reservoirs, means for measuring the rate of water-flow above said high-level reservoir means for regulating the discharge-controlling means of the low-level reservoir in accordance with said rate of flow and means for eliminating variations of pressure at the discharge from the low-level reservoir due to variations of water-level therein, substantially as described.

7. The combination with a head-race and a tail-race, of a high-level storage-reservoir located in the former, a low-level storage-reservoir located in the latter hydraulic-power-distributing means located between the reservoirs, means for controlling the discharge from said reservoirs means for measuring the rate of water-flow above said high-level reservoir and below said low-level reservoir and means for causing differences in said rates of flow to operate the discharge-controlling means of said low-level reservoir, substantially as described.

In witness whereof I have signed this specification in the presence of two witnesses.

FRITZ GOLWIG.

Witnesses:
HERMAN WUNDERLICH,
ALVESTO S. HOGUE.